3,376,125
METHOD FOR REGULATING PLANT GROWTH
William C. McConnell, Atlanta, Ga., and Henry W. Rahn, Pittsburgh, Pa., assignors to Pittsburgh Plate Glass Company, Pittsburgh, Pa., a corporation of Pennsylvania
No Drawing. Filed Sept. 29, 1964, Ser. No. 400,216
10 Claims. (Cl. 71—65)

ABSTRACT OF THE DISCLOSURE

Sodium azide is applied in effective amounts to the soil, to the parts of plants growing therein or to seeds to control the development thereof.

---

This invention relates to sodium azide. More specifically, this invention relates to the use of sodium azide as an agricultural chemical.

Sodium azide may be used either alone or in combination with other chemical compounds to kill, deactivate, or regulate the growth of organisms, for example, plants, fungi, and soil micro-organisms, e.g., bacteria. Sodium azide is also employed according to this invention as a nitrogen source for crop plants. Thus in the preferred embodiment of this invention, a single application of sodium azide provides both pesticidal and fertilizing benefits to the soil.

Sodium azide is a crystalline solid which is readily soluble in water and is stable at all temperatures up to its melting point (300° C.). Aqueous solutions ranging from the most dilute to saturated are also very stable. Solutions containing 250 grams of sodium azide and 750 grams of water, for example, have been stored in sealed containers at room temperatures for periods in excess of a year without significant decomposition.

Apparently, dissolved sodium azide ionizes to sodium and azide ($N_3$) ions. When silver, copper, or lead ions, for example, are introduced into an aqueous solution of sodium azide, the corresponding azide, i.e., silver azide, copper azide, or lead azide respectively is precipitated. The precipitation is quantitative even in very old solutions, i.e. all of the azide introduced into the solution as sodium azide is precipitated out of solution in the form of, for example, silver azide.

Because of the stable nature of sodium azide in solid form and aqueous solution, it is surprising and unexpected that moistened solid sodium azide (or aqueous solution of sodium azide) brought into contact with soil (or other media containing micro-organisms commonly found in the soil) readily decomposes thereby providing nitrogen in a form available to plants. It is believed that soil micro-organisms capable of decomposing sodium azide are normally present in the air. Thus they tend to migrate from the air to surfaces, media and implements associated with agriculture such as non-soil seed beds, e.g., vermiculite, sawdust, straw, gravel, etc., harvested or growing crop plants or plant parts and storage containers.

The time required for sodium azide to decompose when contacted with moistened soil (or other micro-organism bearing media) is dependent upon many factors, e.g., the quantity of azide applied per unit area, the population density of the soil microorganism responsible for its decomposition, and the temperature, moisture and composition of the soil (or other media). Sodium azide applied in accordance with the various embodiments of this invention decomposes substantially completely in a few days to a few weeks, rarely in excess of 30 days after application to the soil, typically sodium azide applied to the soil in rates of about 2 to about 500 pounds per acre decomposes completely within about 3 to about 15 days after application to the soil.

Frequently pesticides decompose into products which are detrimental to plant life, particularly crop plants. By contrast, the decomposition products of sodium azide are normally harmless to plant life in nonalkali soils. In alkali soils, i.e., soils in which excessive amounts of sodium (usually called "exchangeable" or "absorbed" sodium) have replaced calcium and magnesium in the soil colloids, it is often desirable to employ with sodium azide applications soil amendments to combat alkali conditions of the soil. Such amendments are well known and include sulfur, sulfur dioxide, sulfuric acid, gypsum, iron sulfate, and aluminum sulfate.

As the sodium azide remains in contact with the soil, it is decomposed probably by microbial and chemical agents in the soil, to form sodium and nitrogen containing products. The nitrogen containing products are all or partly available as plant food. Neither the sodium nor nitrogen containing products possess the biological toxicity of the sodium azide. Thus in the preferred embodiment of this invention, sodium azide is employed to cleanse the soil of undesirable organisms. Typically, the sodium azide is applied prior to planting seeds in the treated area. Seeds are planted prior to re-establishment of the undesirable organisms in the soil but subsequent to the decomposition of sodium azide into plant food. In this fashion, sodium azide is utilized both as a herbicide and as a fertilizer. It is within contemplation that the azide be applied subsequent to planting, either pre- or post-emergence of the crop plants.

Sodium azide is very soluble in water. Twenty-eight percent sodium azide by weight basis the solution may be dissolved in water at 10° C. At 40° C. a solution containing up to about 50 percent by weight sodium azide, basis the solution, is conveniently prepared. Sodium azide solutions may be stored and used in vessels of mild steel, stainless steel, or nickel, for example, for time periods normally required in agricultural practice without significant reaction between the azide solution and the material in the container. Thus, in all the embodiments described herein, sodium azide is often conveniently applied in aqueous solution. Other methods of application are within the scope of this invention. Sodium azide may also be applied to soil, wrappers, containers, or directly to plants in the form of, for example, crystals, granules, or finely comminuted dry dust. It is sometimes convenient to mix solid sodium azide with a wettable powder of water-insoluble pesticide, e.g., 2-4-dichlorophenoxyacetic acid. The mixture, containing from less than 1 to in excess of 90 percent by weight azide, is conveniently mixed in aqueous media prior to application.

Sodium azide may be ground to a very fine powder size, usually minus 100 mesh and applied as a dust. It is usually desirable to dilute the azide with an inert diluent such as silica, clay, talc, bentonite, diatomaceous earth, wood flour, etc. Good distribution of the azide is usually facilitated by diluting the azide with up to in excess of 99 percent inert dust. Sometimes formulations containing about 5 to about 25, rarely in excess of 30 percent, azide are useful. Another effective method of diluting sodium azide for solid application is to supply the azide as an absorbed ingredient on granules of inert material, for example, attapulgite clay, corn cobs, sawdust, bentonite, walnut shells, etc. The azide may also be absorbed or coated on other pesticides, pesticide-containing granules, or fertilizers, especially natural fertilizers such as manures, activated sludge, etc. Sodium azide is usually present in these granules, etc. in amounts of less than 25 percent by weight basis the granules including all absorbed constituents. Although much greater proportions are possible and within contemplation, the sodium azide content of these granular products typically ranges from about 1 percent to about 20 percent, most often about 2 percent to about 10 percent.

It has been discovered that sodium azide has several heretofore unappreciated useful agricultural properties. Thus, sodium azide applied in accordance with this invention may be utilized, for example, as a defoliant, growth regulator, seed protectant, or stimulant of delayed germination.

According to one specific embodiment of this invention, sodium azide is utilized as a plant growth regulator. Thus sodium azide dust, spray or solution is applied to the appropriate plant part to kill, stunt, or retard growth of buds, flowers, runners, (e.g., tobacco suckers) or the fruit of growing plants. This treatment is effective in thinning fruits such as for example, apples, peaches, pears, plums, cherries, berries, or citrus fruits. It is also effective in preventing seed formation, notably of weeds and in altering plant growth, notably in developing ornamental plants. A noteworthy application of this embodiment is the application of sodium azide solution to sugar cane to prevent tassling thereby enhancing the sugar content of the stocks. The sodium azide is preferably applied as a dilute aqueous solution. Solutions of about 1 to about 20 percent by weight, basis the solution, sodium azide in water are usually employed. If it is desired merely to inhibit development of the treated plant part rather than to destroy the part entirely solutions containing about 1 to about 5 percent by weight sodium azide are usually preferred.

According to a further specific embodiment of this invention, dilute, i.e., solution or dust containing about 1 to about 20 percent by weight sodium azide is applied to a crop prior to harvest. The crop is in this fashion defoliated so that the harvested crop is free from undesirable foliage. Application rates in the process of this embodiment are typically about 2 to about 20 pounds per acre although higher rates are sometimes useful. According to this embodiment, aerial portions of cotton plants, for example, are sprayed when the bolls are mature to cause the leaves to die and fall off the plant. When the bolls are subsequently harvested with a mechanical picker, the incidence of green stains on the bolls normally caused by leaves are significantly reduced. Similarly, seed recovery from alfalfa seed crops is enhanced by defoliation of the alphalpha plants prior to threshing. Substantially higher rates of sodium azide, i.e., up to about 500 pounds per acre are often applied to a field when it is desired to utilize the sodium azide either to provide other herbicidal effects or to provide available nitrogen to the field in addition to defoliating the crop plants therein.

Seed protection and delayed germination of seeds are accomplished by applying sodium azide, usually in the form of a dust or spray, directly to the seeds. The azide apparently kills organisms which normally prevent proper germination and growth of the seed and/or seedling. The azide subsequently decomposes, the nitrogen containing decomposition products stimulating growth of the seedling. Sufficient azide is applied to the seeds to kill the undesirable organisms. However, care is taken that the azide dosage is below that tolerated by the seeds. It is often desirable to add sufficient azide to the seeds to retard germination until well after the undesirable organisms are killed. In the practice of this embodiment, dust, dip or spray usually contains about 20 parts per million to about 1000 parts per million of sodium azide depending upon the azide tolerance of the seed and other conditions, e.g., temperature, moisture, and chemistry of the soil. Usually, the application of the azide is done by briefly contacting the seed with the azide-containing medium. The ultimate dosage consists of the azide present in the medium which clings to the seed. This embodiment may also be practiced by applying the azide directly to the soil, either pre- or post-planting or along with the seeds.

A spray or dip of sodium azide on harvested fruits or vegetables is effective in inhibiting or preventing post harvest deterioration. The deterioration inhibited by this treatment includes rots typically caused by fungi and/or soil microorganisms, e.g., bacteria, sprouting, budding, and the natural results of continued respiration or enzyme activity in the harvested plant product. Thus for example, when a sugar beet is dipped in an aqueous solution containing about 0.1 to about 5 percent sodium azide, the respiration of the sugar beets is inhibited. Respiration of the sugar beets normally consumes sugar. Thus, the sugar content of a beet is maintained at a high level by inhibiting respiration thereof. Within a relatively short period, rarely in excess of a week, the combination of the moisture on the surface of the sugar beet and the micro-organisms migrating from the air to the beet surface effects the decomposition of the sodium azide on the beet so that the sugar beet is fit for human consumption. A similar treatment of potatoes retards the conversion of starch to undesirable sugar by substantially reducing the enzyme activity of the potatoes. Although the toxicity of sodium azide is dissipated when sodium azide decomposes, the effect of the azide on the biological processes of the harvested plant parts usually extends beyond the life of the azide. Often these effects are permanent.

The following example illustrates the manner in which the invention may be practiced.

EXAMPLE I

An assortment of weed seeds, including pigweed, barnyard grass, Kochia and crabgrass were placed in approximately equal amounts in 6 inch petri dishes which contained two pieces of filter paper saturated respectively with 10 cc. of 20 parts per million by weight aqueous solution of isopropyl N-phenylcarbamate (IPC), isopropyl N-(3-chlorophenyl) carbamate (CIPC), sodium azide, and a water control. The petri dishes were kept in the dark at 80 to 85° F. Each dish had its own glass cover. Five days after treatment, it was noted that the seeds were growing well in the water control. The seeds treated with IPC evidenced some stunting. The seeds in the dish treated with CIPC evidenced marked stunting. The seeds treated with sodium azide exhibited no growth. Ten days after treatment, 10 cc. of water was added to each dish. Fifteen days after treatment the seeds which had been treated with IPC and CIPC exhibited stunted growth compared to the water treated control. The seeds treated wits sodium azide showed better growth than those treated with water.

Although the instant invention has been described with particular reference to specific embodiments and examples, it is not intended thereby to limit the scope of this invention except insofar as specific limitations are recited in the claims.

We claim:

1. A method of defoliating plants which comprises applying an effective amount of sodium azide to cause the foliage of said plant to fall therefrom.

2. The method of claim 1 wherein about 2 to about 20 pounds per acre sodium azide is applied.

3. The method of claim 2 wherein the sodium azide is applied in aqueous solution.

4. The method of claim 2 wherein the sodium azide is applied as dust in admixture with an inert material.

5. A method of inhibiting growth of a selected plant part which comprises applying an effective amount of sodium azide to said plant part to inhibit the growth thereof.

6. The method of claim 5 wherein an aqueous solution of sodium azide is applied to the runners of the plant.

7. The method of claim 6 wherein the azide solution is applied to the runners of tobacco plants.

8. The method of claim 5 wherein an aqueous solution of sodium azide is applied to the buds of the plant.

9. The method of claim 5 wherein an aqueous solution of sodium azide is applied to the flowers of the plant.

10. The method of claim 5 wherein an aqueous solution of sodium azide is applied to the fruit of the plant.

References Cited

UNITED STATES PATENTS

| | | | |
|---|---|---|---|
| 1,819,399 | 8/1931 | Wessenberg | 167—14 |
| 3,074,845 | 1/1963 | Geary | 167—42 |
| 2,277,744 | 3/1942 | Cupery et al. | 71—2.2 |
| 2,367,795 | 1/1945 | Meyer | 71—2.2 |
| 2,521,713 | 9/1950 | Goety | 167—14 |
| 2,573,738 | 11/1951 | Smith | 167—14 |

OTHER REFERENCES

Hill et al.: Chemical Weed Control in Tobacco Plant Beds, pages 3, 9, 17, 18, 20, 22, 24, 33, 34 and 42 (1953).

Danielson: Weeds, vol. 13, No. 2, pages 96–98 (1965).

Lundegardh: Chem. Abstract, vol. 44–5964 (1950).

Russell: Chem. Abstract, vol. 49–6381 g (1955).

JAMES O. THOMAS, JR., *Primary Examiner.*

LEWIS GOTTS, *Examiner.*

A. ADAMCIK, *Assistant Examiner.*